(12) United States Patent
Dahl et al.

(10) Patent No.: US 8,390,966 B2
(45) Date of Patent: Mar. 5, 2013

(54) POWER SWITCH FOR PREVENTING ACCIDENTAL ARCS

(75) Inventors: Samuel Dahl, Vasa (FI); Andreas Schumacher, Dattenberg (DE); Wolfgang Wagner, Leverkusen (DE)

(73) Assignee: Eaton Industries GmbH, Bonn (DE)

( * ) Notice: Subject to any disclaimer, the term of this patent is extended or adjusted under 35 U.S.C. 154(b) by 426 days.

(21) Appl. No.: 12/599,224

(22) PCT Filed: May 9, 2008

(86) PCT No.: PCT/EP2008/003748
§ 371 (c)(1),
(2), (4) Date: Nov. 6, 2009

(87) PCT Pub. No.: WO2008/138557
PCT Pub. Date: Nov. 20, 2008

(65) Prior Publication Data
US 2010/0214724 A1    Aug. 26, 2010

(30) Foreign Application Priority Data
May 10, 2007  (DE) .......................... 10 2007 022 401

(51) Int. Cl.
*H02H 9/00*    (2006.01)
(52) U.S. Cl. ............................................ 361/42; 361/54
(58) Field of Classification Search .................. 361/54, 361/57, 96, 97, 98, 95, 94, 42
See application file for complete search history.

(56) References Cited

U.S. PATENT DOCUMENTS 4,878,144 A * 10/1989 Nebon ............................ 361/96
5,307,230 A *  4/1994 MacKenzie .................... 361/96
(Continued)

FOREIGN PATENT DOCUMENTS

CA    2686750 A1   11/2008
DE   19743997 A1    4/1999
(Continued)

OTHER PUBLICATIONS

Santos et al.:"New Strategy to Counteract Arc Flash Hazards" Transmission & Distribution Conference and Exposition: Latin America, 2006; TDC'06, Aug. 1, 2006, pp. 1-6.

(Continued)

*Primary Examiner* — Ronald W Leja
(74) *Attorney, Agent, or Firm* — Leydig, Voit & Mayer, Ltd.

(57) ABSTRACT

A power switch disposed in a housing includes a contact breaker configured to connect and disconnect a low-voltage switchgear from a power source supplying the low-voltage switchgear, a triggering device configured to disconnect the low-voltage switchgear in an overload event, a current detection device, a control device, a first evaluation device configured to evaluate an accidental arc overcurrent, and a second evaluation device configured to evaluate the accidental arc overcurrent. The power switch is configured to be activated via an overcurrent signal generated by an arc monitoring system in response to the accidental arc overcurrent. The overcurrent signal is linked to the at least one triggering signal. The second evaluation has a threshold above a threshold of the first evaluation device. The triggering device is configured to be activated via a turn-off pulse when a signal from the current detection device is above the threshold of the second evaluation device.

9 Claims, 3 Drawing Sheets

U.S. PATENT DOCUMENTS

| | | | |
|---|---|---|---|
| 5,629,824 A * | 5/1997 | Rankin et al. | 361/57 |
| 6,175,479 B1 * | 1/2001 | Boyd et al. | 361/96 |
| 7,145,757 B2 * | 12/2006 | Shea et al. | 361/2 |
| 7,148,696 B2 * | 12/2006 | Zhou et al. | 324/527 |
| 7,499,251 B2 * | 3/2009 | Byron | 361/42 |
| 7,821,749 B2 * | 10/2010 | Asokan et al. | 361/1 |
| 7,929,260 B2 * | 4/2011 | Roscoe et al. | 361/2 |
| 2005/0152078 A1 | 7/2005 | Shea et al. | |
| 2006/0164097 A1 | 7/2006 | Zhou et al. | |
| 2008/0170344 A1 | 7/2008 | Byron | |

FOREIGN PATENT DOCUMENTS

WO 9921255 A1 4/1999

OTHER PUBLICATIONS

International Search Report dated Aug. 18, 2008 issued in connection with PCT/EP2008/003748.

* cited by examiner

POWER SWITCH FOR PREVENTING ACCIDENTAL ARCS

CROSS REFERENCE TO PRIOR APPLICATIONS

This application is the U.S. National Phase application under 35 U.S.C. §371 of International Application No. PCT/EP2008/003748, filed May 9, 2008, and claims benefit to German Patent Application No. 10 2007 022 401.1, filed May 10, 2007. The International Application was published in English on Nov. 20, 2008 as WO 2008/138557 under PCT Article 21(2).

FIELD

The present invention relates to a multipolar power switch in a housing including a contact breaker means for connecting to or disconnecting from a power source supplying a low-voltage switchgear, to a triggering means for disconnecting the low-voltage switchgear in the event of overloading, to a current detection means for detecting the conductor currents supplying the low-voltage switchgear, to a preferably electronic control means for processing the detected conductor currents and to the generation at least of triggering signals to the triggering means.

BACKGROUND

The cutout capability and switch-off time of a power switch in the event of an overcurrent, a short-circuit or an accidental arc are dependent on various parameters. The switching-off process is composed of the triggering time, the inherent time and the switch-off time. The triggering time is the time from the occurrence of the variable causing the triggering to the initiation of the triggering process, for example the disengagement of a switch latch. This is followed by the inherent time of the switch, which depends on the dynamic processes of the moving and opening contacts of the switch. In the case of a switch for a relatively high power range (nominal current of up to 100 kA), switch-off times can be up to 50 to 65 msec. There are power switches which include electronic triggering means (for example, DE 19743997 A1) and allow the functional configuration of the protective conditions for a switchgear to be variably adjusted. However, the switch-off times are not altered by this electronic means.

The occurrence of an accidental arc in an electrical installation can cause serious damage to persons and/or to property; such injury and damage should be limited as much as possible if not ruled out. To avoid such damage there have been proposed various measures, of which the cut-off (the extinguishing) of the accidental arc in a time shorter than the switch-off time of the feed switch is the optimum solution. The detection of accidental arcs requires current transformers which have to be added to a switchgear installation. This takes up space and is expensive. Furthermore, additional means have to be installed to extinguish an accidental arc. The additional costs of accidental arc extinguishing means are not always financially justifiable.

A publication ("New Strategy to Counteract Arc Flash Hazards" in TANSMISSION & DISTRIBUTION CONF. and EXPOSITION: LATIN AMERICA, 2006, IEEE, pages 1-6; by Santos L. F. et al.) describes an arc monitoring system, which reacts to the occurrence of an accidental arc. The system is associated with one control means, for evaluating the accidental arc overcurrent. A turn-off pulse will be issued merely if the signal from the current detection means is above a preadjustable threshold.

SUMMARY

An aspect of the present invention is to provide to a power switch an arrangement which leads to a reduction in the switch-off time thereof.

In an embodiment, the present invention provides a power switch disposed in a housing. The power switch includes a contact breaker configured to connect and disconnect a low-voltage switchgear from a power source supplying the low-voltage switchgear, a triggering device configured to disconnect the low-voltage switchgear in an overload event, a current detection device configured to detect at least one conductor current supplying the low-voltage switchgear, a control device configured to process the detected at least one conductor current and to generate at least one triggering signal to the triggering device, a first evaluation device configured to evaluate an accidental arc overcurrent, and a second evaluation device configured to evaluate the accidental arc overcurrent. The power switch is configured to be activated via an overcurrent signal generated by an arc monitoring system in response to the accidental arc overcurrent. The overcurrent signal is linked to the at least one triggering signal via the first evaluation device and the triggering device. The second evaluation device is associated with the control device and has a threshold above a threshold of the first evaluation device. The triggering device is configured to be activated via a turn-off pulse when a signal from the current detection device is above the threshold of the second evaluation device.

BRIEF DESCRIPTION OF THE DRAWINGS

Further details and advantages of the present invention will emerge from the following exemplary embodiments illustrated in the drawings, in which.

DETAILED DESCRIPTION

Figure 1:
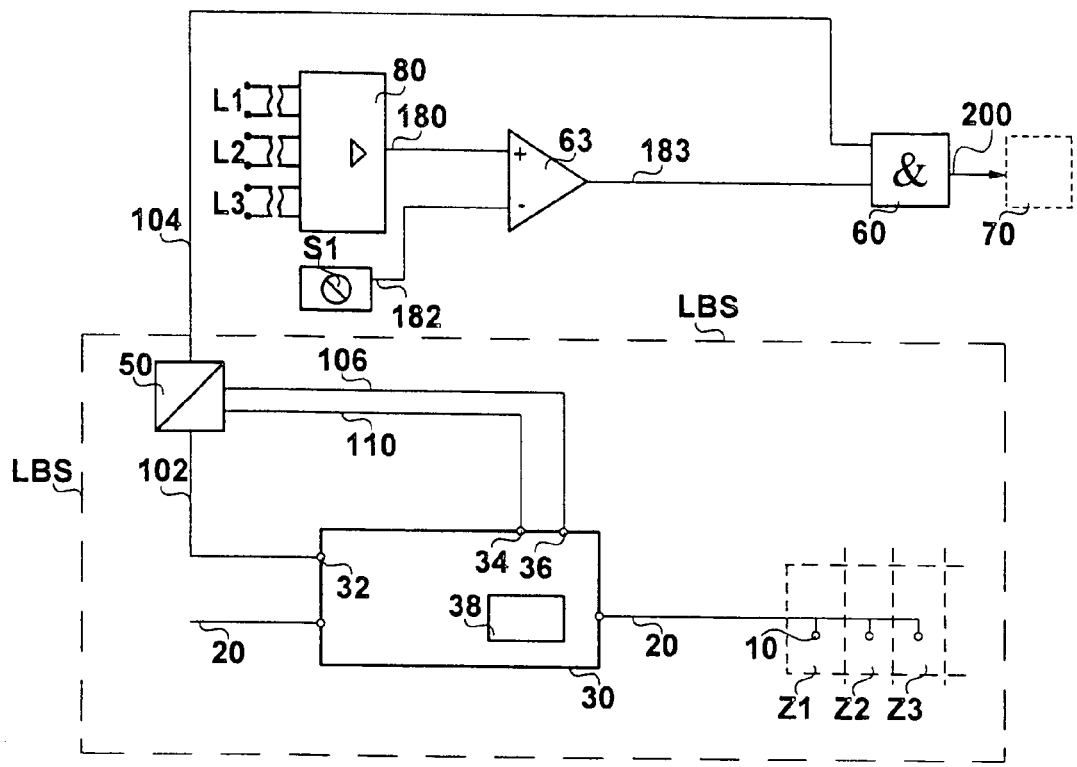
FIG. 1 shows a schematic construction in accordance with an embodiment of the present invention in the form of a circuit logic.

An aspect of the present invention provides that the power switch can be activated by an overcurrent evaluation device (arc monitoring system) which reacts to an accidental arc occurring in the low-voltage switchgear, and an overcurrent signal arriving from the arc monitoring system can be linked to the signal for triggering the control means via a first evaluation means for evaluating the intensity of the overcurrent originating from the accidental arc, and the means for triggering the power switch is activated, on issuing of a turn-off pulse, merely if the signal from the current detection means is above a preadjustable threshold. The occurrence of the flash of the accidental arc and the rapid rise in the fault current based on the arc produce a switching signal from the arc detection and evaluation unit directly to the means for triggering the power switch which is thus caused to open the contacts.

An advantage of the present invention is that, as a result of the direct activation of the means for controlling the power switch, the triggering mechanism is activated earlier (and therefore more rapidly) than in the event of activation via the device-internal current detection means of the power switch. The present invention allows integration of the evaluation of data relevant to the accidental arc and utilisation of the current transformers which are present in the power switch anyway, associated with a reduction in the switch-off time for accidental arc prevention without making use of a potentially usable arc extinguishing device.

The switch-off command for the power switch is generated in the actual electronics of the power switch and acts directly on the magnet coil of the electronic triggering means. The direct influencing of the triggering process allows the switch-off time to be markedly reduced. In other power switches, the relay inherent time and the triggering chain using working current triggering means add up to a switch-off time of approx. 65 ms. The solution provided allows this time to be reduced by 20 to 30 ms, which means a reduction of about 50%.

The present invention has clear advantages in terms of cost. An accidental arc prevention means having a modular structure can be constructed. The use of power switches according to an embodiment of the present invention should allow accidental arc prevention systems to become more widespread.

Accidental arc prevention systems generally detect not only optical phenomena but also a second physical variable. This is generally the current intensity. Detecting the current intensity requires current transformers which take up space and entail additional costs. The present invention utilises the current transformers which were already provided in the power switch and had previously been used merely for triggering the power switch.

Further advantageous embodiments of the present invention include the following features which may be used individually or in combination with one another.

Preferably, the threshold of the first evaluation means should be set to double the nominal current. For specific switchgear fittings characterised, for example, by high conductor impedances, the threshold would be reduced.

The current detection means of the power switch typically use Rogowski coils.

The arc monitoring system includes at least one accidental arc sensor, the output signal of which can be transmitted to the control means via at least one monitoring line.

Accidental arc sensors detect physical effects which occur when accidental arcs appear. Preferably, the optical phenomena from the accidental arc are detected, so that optical detection means (namely photodiodes and/or optical fibres) are mainly proposed. An electronic gateway module may be inserted between the aforementioned monitoring line and the means for controlling the power switch. The gateway module combines access means of monitoring lines (which are preferably connectable to the gateway module via connectors) and at least one output line to the control means. Communication between the arc monitoring system and power switch is thus mediated in the gateway module.

The signals from the accidental arc sensor are optical signals if optical detection means are used. The gateway module accordingly includes optical couplers in which the light signal is converted into an electrical signal for activating the means for controlling the power switch. The gateway module is thus electrically isolated from the control means. The monitoring line for transmitting an alarm signal may preferably be configured as an electronic bus.

The assembly according to an embodiment of the present invention can be combined with a means (henceforth "short-circuiting means") which, in the event of an accidental arc, is activated in order to short-circuit phase-current-carrying flow paths. It is therefore possible, in addition to the detection of accidental arcs and the process, based on the detection, for switching off the power switch, to eliminate the almost incipient accidental arc. A short-circuiting means generates a metallic short-circuit which withdraws the power supplied to the accidental arc in less than 2 msec. There should therefore be configured in the control means a signal output for activating a short-circuiting means. This allows the assembly according to an embodiment of the present invention to be retrofitted at any stage with a short-circuiting means.

If the aforementioned short-circuiting means is used, a second evaluation means for evaluating the accidental arc overcurrent should be associated with the control means. The preadjustable threshold of the second evaluation means should be above the threshold of the first evaluation means and the short-circuiting means should be activated, on issuing of a turn-off pulse, merely if the signal from the current detection means is above the threshold of the second evaluation means. Preferably, the threshold of the second evaluation means should be set at four times the nominal current. There are, as it were, two accidental arc prevention levels. These measures prevent the short-circuiting means from being activated at low accidental arc currents, as in the first place merely the power switch is connected as a result of the adjustable threshold values. At relatively high accidental arc currents is the short-circuiting means triggered almost immediately.

Use is advantageously made of an aforementioned electronic gateway module via which the short-circuiting means is activated using an actuating signal. As indicated hereinbefore, the gateway module is the communication member between the power switch and accidental arc detection and prevention system. It is also possible to stipulate in the gateway module that the short-circuiting means is activated merely if an accidental arc occurs in a preselectable compartment of the low-voltage switchgear. As a result of this, the cut-off of the accidental arc (by the short-circuiting means) can be associated with specific protective zones of the switchgear (this will be described in greater detail hereinafter). The accidental arc prevention system may therefore be adapted to differing switchgears and is thus extendible without subsequent alterations.

In the manner of a simplified embodiment, a gateway module may be dispensed with if the arc detection signal is fed directly (via an opto-electronic gateway) to the electronics of the power switch. In a case of this type, the at least one light sensor may be connected directly to an input on the power switch.

The short-circuiting means for producing a short-circuit should be arranged on the load side (i.e. after the power switch) between the conductor rails of the load side. However, there may also be circuitry installations in which it is more beneficial to arrange the short-circuiting means on the mains side (i.e. before the power switch). In this case, the purpose of the superordinate power switch is to connect the installation as a whole in a voltage-free manner in the event of a short-circuit generated by the short-circuiting means.

The power switch may have a lock to prevent the power switch from being switched back on, which lock becomes operative after triggering of the switching function in the short-circuiting means. The locking function may be mechanical or electromechanical in its configuration. This ensures that the switchgear can be reactivated once an actuated short-circuiting means has been exchanged for a functionally new short-circuiting means and once the locking function has been cancelled.

The figures each show the schematic construction of embodiments of the present invention in the form of a circuit logic. The elements of the circuit arrangement may be discrete electronic components or integrated electronic components (microprocessors). Programmable, digital electronics may, in particular, be used instead of a rigid hardware construction (for example in forming a programmable controller). Alterations may then easily be made in terms of programming.

The elements in the figures are components of a power switch in a housing, excluding the arc detection unit LBS and the arc extinguishing means 12, LBQ, which are located outside the power switch.

Like many power switches, the construction according to an embodiment of the present invention includes a contact breaker means for connecting to or disconnecting from a power source supplying a low-voltage switchgear, a triggering means 70 for disconnecting the switchgear in the event of overloading, a current detection means 80 (for example, Rogowski coils) for detecting the conductor currents L1, L2, L3 supplying the low-voltage switchgear, and a control means for processing the detected conductor currents of the phases L1, L2, L3 and for the generation at least of triggering signals 183 to the triggering means 70. The triggering means 70 may preferably be an electronic triggering means, so the assembly according to an embodiment of the present invention, configured as a logic circuit, may easily be integrated.

The elements of the control means are the threshold value adjustment means S1, adjustable by means of an adjustment button (accessible on the front of the power switch), the means for guiding an overcurrent signal 180 to a first comparator 63 at which the adjustment signal 182 undergoes the threshold value adjustment S1 and the means for forwarding the overcurrent signal 183 to the AND operation 60 where the electrical alarm or overcurrent signal 104 arrives from the accidental arc detection means LBS. If the overcurrent signal 180 is above the threshold set in the threshold value adjustment means S1, the mechanism 70 for triggering the power switch is addressed via the activation (turn-off pulse) 200, so the contacts open.

The adjustment range of the threshold value adjustment means S1 can include nominal current $I_N$ values of from 0.5 to 6. For typical uses, S1 may be set to 2 $I_N$.

Figure 2:
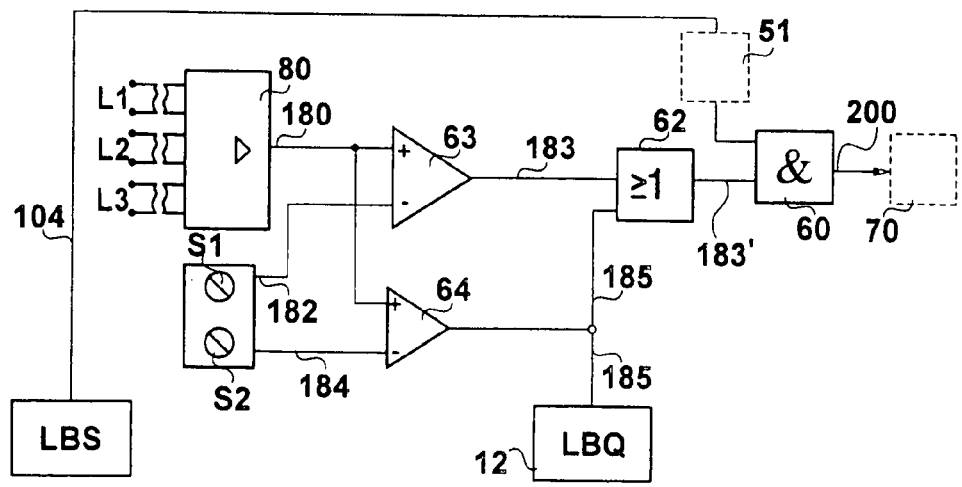
FIG. 2 shows the construction of the circuit logic incorporating a short-circuiting means.

The arc detection unit LBS is schematically indicated in FIG. 2, in which an arc extinguishing means 12, LBQ is also schematically indicated.

FIG. 1 shows the details of the arc detection unit LBS. The arc monitoring system LBS includes at least one accidental arc sensor 10 which may be configured as a point sensor (photodiode) or a line sensor (optical fibre). The arc sensors may also be connected via a monitoring bus. Z1, Z2, Z3 denote compartments of the electrical switchgear each containing accidental arc sensors.

The division of a low-voltage switchgear into compartments Z1, Z2, Z3 defines differing functional units and protective zones. Differing subdivisions (busbar chambers, device chambers, connection chambers, each including partitions, covers or device sheaths) reduces the potential risks to staff performing maintenance and connection work. However, subdivisions produce shading for the arc sensors. The arrangement and selection of the arc sensors (point or line sensors) depend on the degree of subdivision of the switchgear. The electronic gateway module 30 may contain a means 38 for selecting and allocating the arc sensors to the compartments Z1, Z2, Z3. Depending on the construction of the switchgear set up by a user, the gateway module is able, when retrofitting the switchgear with arc sensors, to allow for the nature and sensitivity of the arc detection by setting zone selection switches 38. The zone selection switches may preferably be configured as DIP switches. Thus, the gateway module may also be configured in such a way that the short-circuiting means is activated merely if an accidental arc occurs in a preselectable compartment of the low-voltage switchgear. The assembly according to an embodiment of the present invention is therefore flexible and adaptable for retrofitting without the assembly having to be specifically connected in advance.

Figure 3:
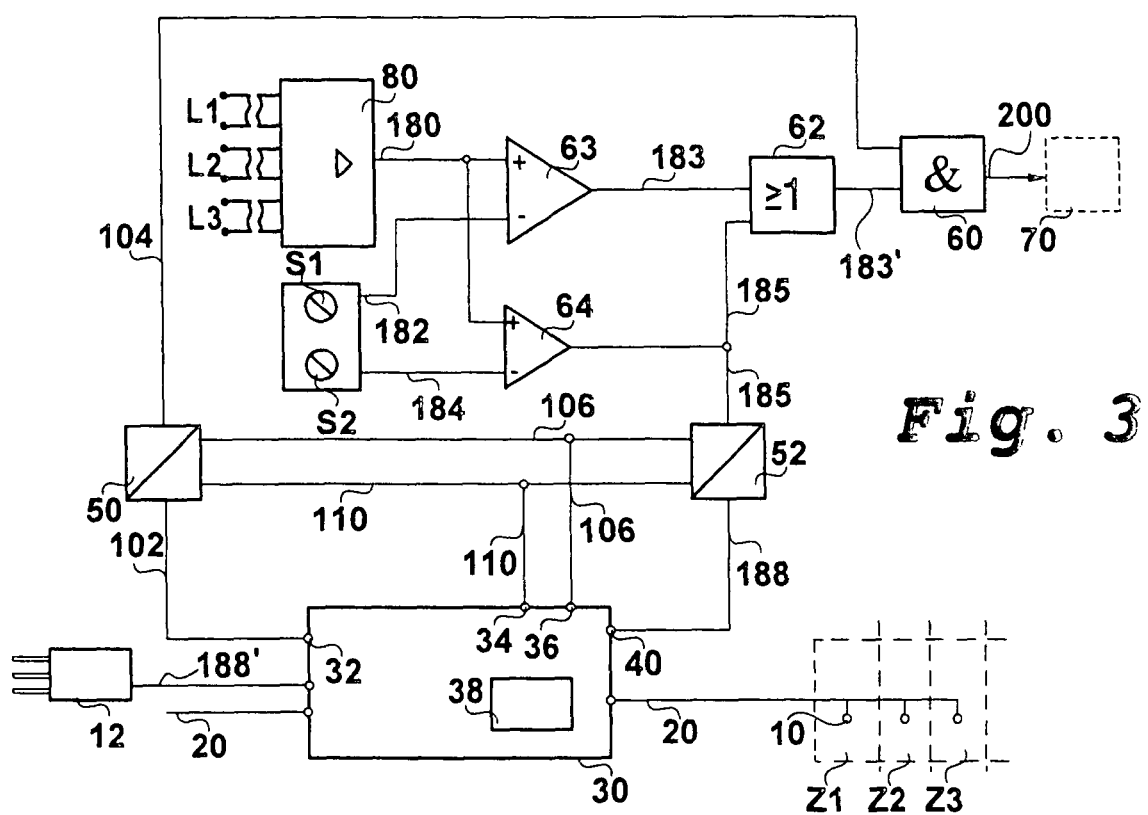
FIG. 3 is a detailed illustration of FIG. 2.

The optical signal 20 from an accidental arc passes via the gateway module 30, via the line 102, to an optical coupler 50, which converts the optical signal 102 into the electrical signal 104. The gateway module 30 may be connectable to the optical coupler 50 and the short-circuiting means gateway 52 via a four-pole line, via an RJ45-type mini connector. The short-circuiting means gateway 52 is shown in FIG. 3. It has a binary output for activating the short-circuiting means 12 via an actuating signal 188. The contacts 32, 34, 36, 40 (see also FIGS. 3 and 4) may be combined in the RJ45-type mini connector.

The position and arrangement of the current paths carrying the conductor currents L1, L2, L3 are not shown. The short-circuiting means 12, LBQ is located spatially between the current paths as illustrated, for example, in WO 99/21255 A1.

FIG. 2 illustrates that the control means S1, 180, 182, 183, 60 is a second evaluation means S2, 184, 64, 185 for evaluating the accidental arc overcurrent. The preadjustable threshold S2 of the second evaluation means S2, 184, 64, 185 is in this case set so as to be higher than the threshold S1 of the first evaluation means S1, 63, 60. The adjustment range of the threshold value adjustment means S2 can include values of from twice to ten times the nominal current $I_N$. Typically, S2 is set so as to be twice as high as the setting of S1. The short-circuiting means 12 is activated, on issuing of a turn-off pulse 200, only if the signal 180 from the current detection means 80 is above the threshold S2 of the second evaluation means.

The elements of the second evaluation means are the threshold value adjustment means S2 (with corresponding adjustment button), the means for branching and transmitting an overcurrent signal 180 to a second comparator 64, in which the adjustment signal 184 is subjected to the second threshold value adjustment S2, and the means for forwarding the signal 185 both to the triggering means 70 (via the OR gate 62, AND operation 60 and signal 200) and to the short-circuiting means 12 (via the gateway 52 and gateway module 30).

The short-circuit mechanism 12 of the power switch is not activated if the overcurrent signal 180 is above the threshold set in the threshold adjusting means S1 but below the threshold S2. This is ensured by the OR gate 62. The overcurrent signal 180 is subjected to the AND operation 60 only if the overcurrent condition (according to signal 180) is greater than threshold S2 (e.g. S2=4 $I_N$).

FIG. 3 breaks the schematic illustration of FIG. 2 down into details, although these have already been referred in FIG. 1 and the description thereof.

In FIG. 2, reference numeral 51 denotes an opto-electronic gateway which may also be a component of the means for controlling the power switch. The detection signals 102, 104 from the arc sensors can be transmitted directly to the control means via this gateway without an interface and an optical coupler (as shown in FIG. 1 in both cases) being provided.

Figure 4:
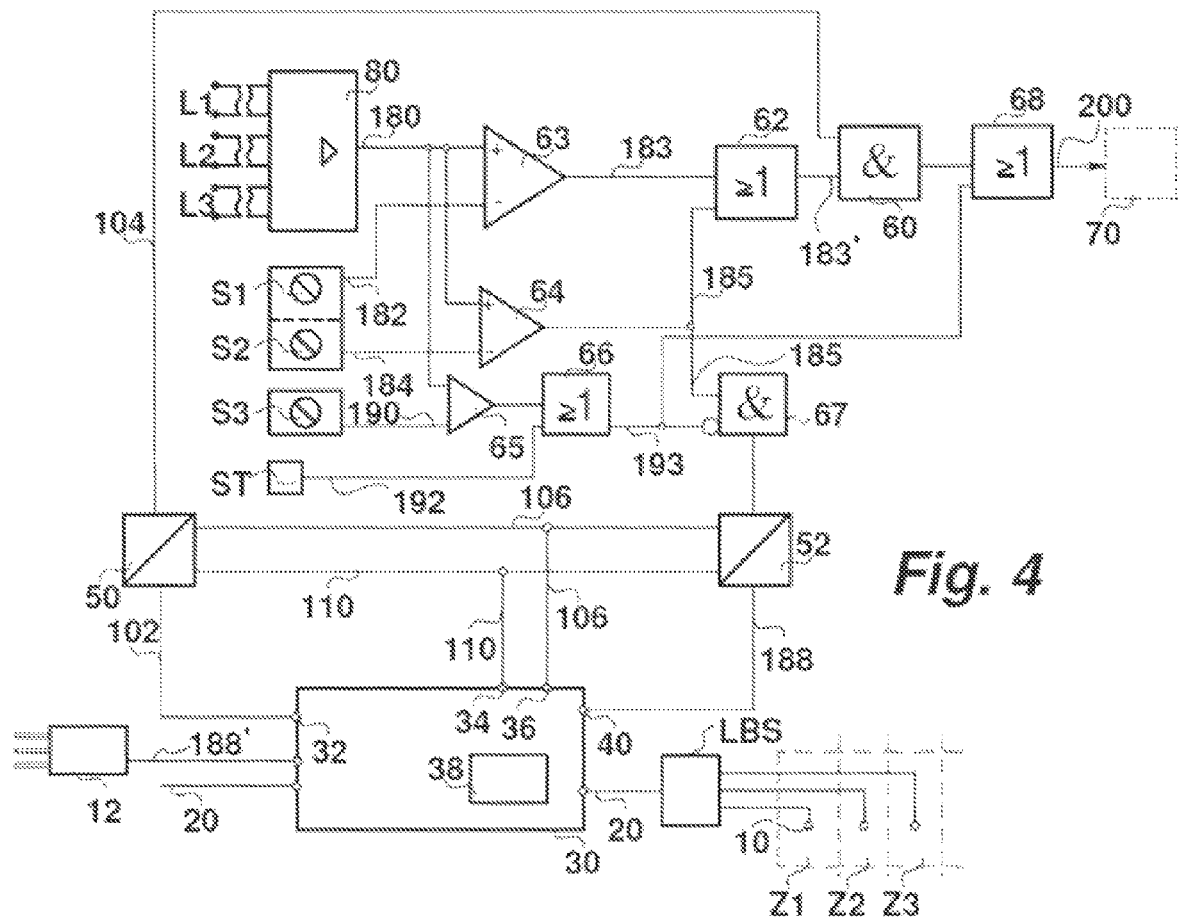
FIG. 4 shows a supplement to the circuit logic including a time-delay means.

FIG. 4 shows an addition to the circuit logic with a time-delay means (66, 67, 193). Switching devices, in particular protection switches for relatively high currents, generate a switching arc. In cases in which the power switch is arranged in the switch arrangement or in the vicinity thereof and the power switch is not spatially separated off, the arc sensors can also detect the switching arc of the power switch. in order to prevent the switching arc from actuating the short-circuiting means 12 during the process for switching OFF the power switch (especially under a high or very high current load), an electronic time-delay means 67 is used to delay the switch-off signal 192 for a short time (approx. 2 to 5 msec). In FIG. 4, a switch-off actuator (manual actuation device) ST for switching off the power switch is shown. The actuation signal 192 is inputted via the current path 193, via the OR gate 66, to the short-circuiting means 12. In a case where the power switch carries a particularly high current, which is above the threshold S3 set by overcurrent adjusting means S3, the switch signal 188 thus reaches the short-circuiting means only after a delay. The threshold S3 of the overload setting is preferably set higher than both of the first two threshold settings (S1 and S2).

While the invention has been particularly shown and described with reference to preferred embodiments thereof, it will be understood by those skilled in the art that various changes in form and details may be made therein without departing from the spirit and scope of the invention

REFERENCE NUMERALS

10 arc sensor (point sensor, LWL)
12 short-circuiting means (arc extinguishing device LBQ)
20 detection line (monitoring bus)
30 gateway module
32 alarm signal socket 102
34 voltage supply terminal (for example, 24 VDC)
36 earth potential socket 106
38 zone selection switch, DIP switch, contact zone allocation (Z1, Z2, Z3)
50 coupling member (optical coupler)
51 opto-electronic gateway
52 short-circuiting means gateway (having a binary output)
60 AND operation
62, 62' OR gate
63 first summer
64 second summer
65 third summer
66 OR gate
67 time-delay means
68 OR gate
70 triggering means (excitation coil, electromagnet)
80 measuring transducer; measured value preparation means; current detection means (for example, Rogowski coils)
102 alarm signal (optical)
104 alarm signal (electrical)
106 earth potential
110 supply voltage (for example 24 VDC)
180 overcurrent signal
182 threshold value S1
183, 183' overcurrent signal above threshold value S1
184 threshold value S2
185 overcurrent signal above threshold value S2
188, 188' short-circuiting means switching command
190 overload control value
191 signal overload control value S3
192 switch-off signal
193 switch-off signal 192 looped in
200 command to triggering means (switch-off signal)
LBS arc monitoring system (overcurrent evaluation device)
LBQ short-circuiting means 12
S1 S2 first, second threshold value setting means
S3 overload controller
ST switch-off actuator
Z1 Z2 switchgear subdivision zones

The invention claimed is:

1. A power switch disposed in a housing, the power switch comprising:
   a contact breaker configured to connect and disconnect a low-voltage switchgear from a power source supplying the low-voltage switchgear;
   a triggering device configured to disconnect the low-voltage switchgear in an overload event;
   a current detection device configured to detect at least one conductor current supplying the low-voltage switchgear;
   a short-circuiting device configured to short-circuit a path of the at least one conductor currents; and
   a control device configured to process the detected at least one conductor current and to generate at least one triggering signal to the triggering device, the control device including a first evaluation device and a second evaluation device configured to evaluate an accidental arc overcurrent;
   wherein the power switch is configured to be activated via an overcurrent signal generated by an arc monitoring system in response to the accidental arc overcurrent, the overcurrent signal being linked to the at least one triggering signal via the first evaluation device and the triggering device; wherein the second evaluation device has a threshold above a threshold of the first evaluation device, the triggering device being configured to be activated via a turn-off pulse when a signal from the current detection device is above the threshold of the second evaluation device; and
   wherein the second evaluation device is associated with the short-circuiting device, the short-circuiting device being configured to be activated when the signal from the current detection device is above the threshold of the second evaluation device.

2. The power switch as recited in claim 1, wherein the current detection device includes at least one Rogowski coil.

3. The power switch as recited in claim 1, wherein the arc monitoring system includes at least one accidental arc sensor configured to transmit an output signal to the control device via at least one monitoring line.

4. The power switch as recited in claim 1, wherein the control device includes an opto-electronic gateway configured to directly receive the overcurrent signal from the arc monitoring system.

5. The power switch as recited in claim 1, wherein the threshold of the second evaluation device is double the threshold of the first evaluation device.

6. The power switch as recited in claim 1, wherein the short-circuiting device is configured to be activated via an actuation signal via a gateway module.

7. The power switch as recited in claim 1, wherein the short-circuiting device is disposed between conductor rails on a load side so as to be configured to produce a short circuit.

8. The power switch as recited in claim 1, further comprising a lock configured to be operative after activation of the short-circuiting device and to prevent power from being switched on.

9. The power switch as recited in claim 1, further comprising an electronic time-delay device configured to delay a short-circuit switch signal to the short-circuiting device by 2 ms to 5 ms.

* * * * *